(12) United States Patent
Shoda

(10) Patent No.: US 7,704,577 B2
(45) Date of Patent: Apr. 27, 2010

(54) BAG

(75) Inventor: Kiyomaru Shoda, Tokyo (JP)

(73) Assignee: Yamatoya co., Ltd., Taito-ku (JP)

( * ) Notice: Subject to any disclaimer, the term of this patent is extended or adjusted under 35 U.S.C. 154(b) by 407 days.

(21) Appl. No.: 11/623,814

(22) Filed: Jan. 17, 2007

(65) Prior Publication Data

US 2007/0184731 A1 Aug. 9, 2007

Related U.S. Application Data

(63) Continuation of application No. PCT/JP2005/013676, filed on Jul. 20, 2005.

(30) Foreign Application Priority Data

| Jul. 20, 2004 | (JP) | ............................. 2004-211953 |
| Jul. 20, 2005 | (JP) | ............................. 2005-209515 |

(51) Int. Cl.
*B32B 1/00* (2006.01)
*B32B 27/06* (2006.01)
*B32B 27/08* (2006.01)
*B65D 30/00* (2006.01)
*B65D 30/02* (2006.01)
*B65D 30/04* (2006.01)
*B65D 33/06* (2006.01)
*D03D 1/04* (2006.01)

(52) U.S. Cl. .................... 428/36.1; 428/35.7; 428/35.9; 442/59; 442/85; 442/86; 442/304; 139/389; 383/6; 383/8; 150/100; 150/127; 150/129

(58) Field of Classification Search ....................... None
See application file for complete search history.

(56) References Cited

U.S. PATENT DOCUMENTS 5,298,303 A * 3/1994 Kerr et al. ................... 428/35.7
5,922,445 A * 7/1999 Yoshida et al. ............ 428/297.4

FOREIGN PATENT DOCUMENTS

| JP | 01-290421 A1 | 11/1989 |
| JP | 04-194084 A1 | 7/1992 |
| JP | 07-041731 A1 | 2/1995 |
| JP | 2003-193377 A1 | 7/2003 |

* cited by examiner

*Primary Examiner*—Jennifer A Chriss
(74) *Attorney, Agent, or Firm*—Burr & Brown

(57) ABSTRACT

A bag having excellent water and perspiration resistance, showing no deterioration of the skin after extended use, and having excellent light resistance, thereby experiencing no discoloration or yellowing under the sun or fluorescent lighting.

5 Claims, 1 Drawing Sheet

BAG

CROSS REFERENCE TO RELATED APPLICATIONS

This application is a continuation of International Application No. PCT/JP2005/013676, having an international filing date of Jul. 20, 2005, and which designated the U.S., and claims the benefit under 35 USC §119(a)-(d) of Japanese Application No. 2004-211953, filed Jul. 20, 2004, and Japanese Application No. 2005-209515, filed Jul. 20, 2005, the entireties of which are incorporated herein by reference.

FIELD OF THE INVENTION

The present invention relates to a bag, particularly to a bag having a skin material formed from polycarbonate.

BACKGROUND OF THE INVENTION

Quality bags generally have a leather skin while general, wide-spread bags have a synthetic leather skin.

Some synthetic leather skins are made of vinyl chloride, which may produce toxic gases during waste treatment.

Polyurethane materials have been extensively used in synthetic leather bags in the prior art because they provide a texture similar to that of leather. Such polyurethane materials are used to coat the surface of a base fabric to form the skin.

However, when bags having a polyurethane skin become wet by rain or are stained with a user's sweating hands, the moisture and polyurethane may be subject to hydrolysis, deteriorating the material. Consequently, for example, the skin surface likely cracks and peels off at the handles after extended use.

Colored parts may fade or the skin surface may turn yellow under the sun or fluorescent lighting.

According to these viewpoints, the composition of synthetic leather has been attempted using polycarbonate, which has excellent hydrolysis resistance.

In Japanese Patent No. 3281126, in order to form synthetic leather where the hydrolysis resistance can be improved in no-yellow discoloration type polyurethane, technologies for synthetic leather and artificial leather using polyurethane, which has been obtained using polytetramethylene carbonate diol, are disclosed.

However, in these technologies described in the above Patent Literature, in general, a technology consisting of a coating agent composition using polycarbonate from the viewpoint to improve the hydrolysis resistance is merely disclosed, and no specific technical composition in the case of forming the skin material of bags is mentioned at all.

The purpose of the present invention is to provide a bag having excellent water and perspiration resistance, the skin of which shows no deterioration after extended use, has light resistance and experiences no discoloration or yellowing under the sun or fluorescent lighting.

Moreover, an object of the present invention is to provide a bag that does not experience deformation or loss of shape during use, even when stress is applied to the skin material due to the weight of its contents after extended use. In addition, another object is to provide a bag where a surface of the skin material is smooth and the quality of apparent condition is excellent.

SUMMARY OF THE INVENTION

In order to resolve the above problems, a bag is provided having a base fabric and a skin material adhered to this base fabric. The base fabric and the skin are adhered by an adhesive made from a material of the skin, and the material of the base fabric is nylon. Concurrently, the material of the skin and adhesive is polycarbonate.

Therefore, in according to the present invention, since nylon where the affinity with the skin material and the adhesive made from polycarbonate is used, the adhesive is excellently adapted to the base fabric and the skin material is excellently adhered to the base fabric with the adhesive.

Preferably, the skin material and adhesive are made from a polycarbonate urethane resin.

Preferably, the base fabric is formed from a half-tricot fabric. As a result, it is experimentally known that the half-tricot fabric using nylon as a material has a low extension percentage in the winding direction of the material in the case of winding the prepared fabric to a roll. Therefore, when a bag consists of a base fabric made from nylon, the bag is made by using the vertical direction of the bag as the winding direction to the roll, and the base fabric hardly stretches along the vertical direction of the bag.

In this case, the skin adhered to the base fabric is made from polycarbonate, and since polycarbonate has a lower extension percentage compared to polyester-series polyurethane, the extension percentage of the entire skin material is also low.

According to another aspect of the present Invention, the surface and adhesive layers are in the form of a film.

According to another aspect of the present invention, the base fabric layer has a thickness of 250 microns, the adhesive layer has a thickness of 46.5 microns, and the skin layer has a thickness of 20 microns.

In the bag according to the present invention, the base fabric made from nylon and the skin made from polycarbonate are adhered with the adhesive made from polycarbonate, which is the same material as that of the skin, and since nylon having an excellent affinity with the skin material and the adhesive made from polycarbonate is used, the adhesive excellently is adapted to the base fabric, and the base fabric and the skin material are excellently adhered by the adhesive.

As a result, the adhesiveness between the base fabric and the skin is excellent, and even if the bag is used for a long time, it is difficult to separate the base fabric and the skin, and a bag with excellent durability.

Moreover, the adhesive made from polycarbonate is used for the adhesion between the skin and the base fabric, and since polycarbonate excels in the hydrolysis resistance, it becomes possible to prevent the moisture intrusion into the skin material from the skin side; concurrently, it also becomes possible to prevent the moisture intrusion into the skin material from the base fabric side, so it becomes possible to effectively prevent the hydrolysis due to the moisture intrusion from the outside of the skin material and the inside of the skin material in the bag.

As a result, it becomes possible to effectively prevent from the separation between the base fabric and the skin material due to the moisture migration from the outside or the inside of the skin material.

In addition, since the skin material is made from polycarbonate skin, even if the bag is stored under high humidity condition or the bag becomes wet by rain or is stained by user's sweating hands, the polycarbonate is not subject to hydrolysis due to the moisture.

Therefore, the skin is prevented from gradually deteriorating. The skin is also prevented from cracking and peeling off at the handles after extended use.

The polycarbonate skin also has excellent light resistance. Therefore, the skin surface is prevented from discoloring or yellowing under the sun or fluorescent lighting.

Furthermore, the polycarbonate skin provides similar texture to leather and is lightweight and flexible, having less negative factors as a bag material.

Moreover, in the case where the skin material and the adhesive are made from a polycarbonate-series polyurethane resin, even when a predetermined external force is applied to a material, both the skin material and the adhesive are strong compared to a conventional common polyurethane-series urethane resin, so a bag having a tough skin material can be provided. As a result, a bag with less change according to age in the shape can be provided.

In the case where the base fabric is formed from half-tricot fabric, when the half-tricot fabric made from nylon, which is a base fabric, is made by using the vertical direction of the bag as the winding direction to a roll, the extension percentage of the base fabric shall be low along the vertical direction of the bag.

As a result, when the bag is used, if the bag is used by holding a handle with a hand or by putting a strap on a shoulder, the stress to pull the bag upward is applied along the vertical direction of the bag. However, even when this stress is applied, the base fabric itself hardly stretches.

Moreover, since nylon, which is a material of the base fabric, has a smaller extension percentage compared to polycarbonate, which is a material of the skin adhered to the base fabric, even when the tension from the lower side to the upper side or various external forces are applied to the skin material during the use of the bag, because the base fabric itself hardly stretches, the skin material hardly stretches, so a loss in shape will not occur to the bag and in addition, the bag shape will not be deformed after extended use.

Moreover, because the base fabric is a half-tricot fabric, the surface of the base material made from nylon is formed to be smooth. Therefore, even when a thin polycarbonate layer is formed on the upper surface of the base fabric, since the mesh of tricot hardly expresses on the skin side, a surface of the smooth skin material can be formed, and a bag enabling fine surface pattern embossing or fine print processing and having excellent quality of apparent condition.

In addition, since the base fabric is the half-tricot fabric, while the surface is smooth, it has voids with appropriate mesh, so an adhesive made from polycarbonate, which is applied on to the base fabric, can deeply enter into the mesh, and the adhesive enters into the base fabric. As a result, because the skin can strongly adhere to the base fabric, even if various forces, such as flexion or tension, are applied to the skin material of the bag from the outside at the time of use, it is difficult to separate the skin and the base fabric.

As a result, a bag where a change in shape or a loss in shape is less after extended use, and which excels in the durability, can be provided.

Moreover, as described above the base fabric of a half-tricot fabric made from nylon hardly stretches along the vertical direction and the base fabric and the skin are strongly adhered and polycarbonate has a lower extension percentage compared to conventionally used polyester-series polyurethane, so even when there are contents in the bag, the skin hardly stretches along the vertical direction and a situation where the skin is torn off after extended use can be prevented.

In addition, the half-tricot fabric has tear strength and even when a small cut is formed on the skin, a situation where the cut extends and the skin is torn off can be prevented.

In the bag according to the present invention, since the skin layer and the adhesive layer are in the form of a film, when the adhesive layer is laminated on the base fabric layer and the skin layer is further laminated on the adhesive layer, the skin layer also in the form of a film is adhered onto the base fabric layer via the adhesive layer in the form of a film, so the skin material production process is simplified, and the cost can be reduced.

Furthermore, with the adhesive and skin layers being in the form of a film, the skin entirely has a uniform thickness, therefore improving quality.

In the bag according to the present invention, the base fabric layer has a thickness of 250 microns, the adhesive layer has a thickness of 46.5 microns, and the skin layer has a thickness of 20 microns. The overall thickness is not excessively increased. The bag has a proper thickness for lightweight and flexibility, having excellent usability.

Moreover, in addition to the fact that the half-tricot fabric is thinner than double-tricot fabric, the bag has an appropriate thickness to maintain lightweight and flexibility, and it is user-friendly.

Moreover, the skin material forming the entire synthetic leather of the bag will not be excessively thick, a bag that is not bulky but is foldable can be provided.

With the base fabric layer having a thickness of 250 microns, the skin has proper rigidity and maintains its shape better.

With the adhesive layer having a thickness of 46.5 microns, the skin layer is reliably fixed onto the base fabric layer and scarcely peels off.

With the skin layer having a thickness of 20 microns, the bag has sufficient hydrolysis resistance, light resistance, and durability.

DETAILED DESCRIPTION OF THE INVENTION

An embodiment of the present invention is described hereafter, with reference to the drawings.

Figure 1:
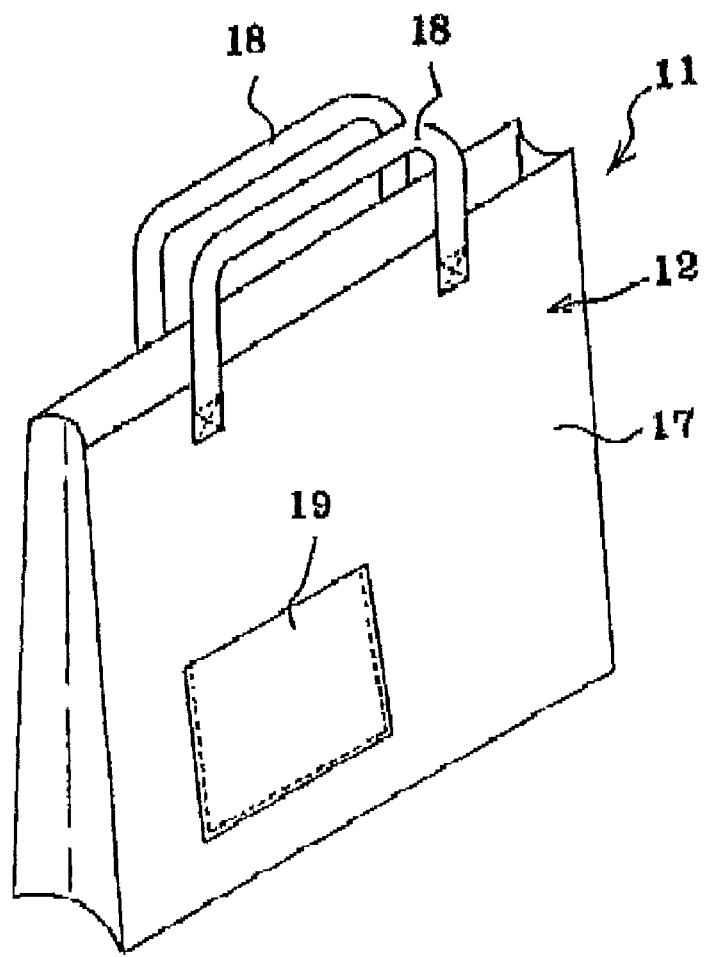
FIG. 1 is a perspective view of a bag.

In a bag 11 relating to the present embodiment, as shown in FIG. 1, a skin 12 consists of a base fabric layer 13 made from a nylon material, a skin layer 15 formed on this base fabric layer 13, and an adhesive layer 16 arranged between the skin layer 15 and the base fabric layer 13, and the skin layer 15 and the adhesive layer 16 made of a polycarbonate material.

Figure 2:
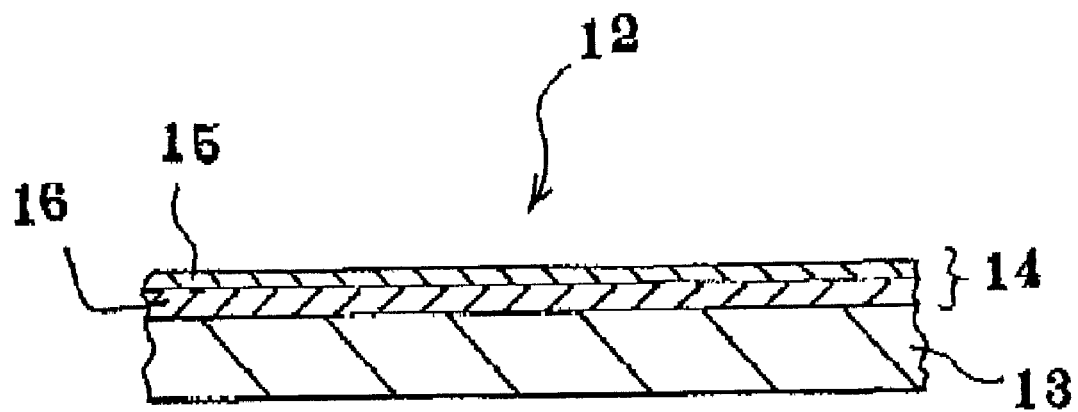
FIG. 2 is a partially sectional view of the bag skin.

The base fabric layer 13 is formed from a half-tricot fabric made from a nylon material. Moreover, the skin 12 consists of a base fabric layer 13 and a polycarbonate layer 14 formed on the base fabric layer 13, as shown in FIG. 2.

In other words, in the present embodiment, the base fabric layer 13 has a thickness of 250 microns. The adhesive layer 16 has a thickness of 46.5 microns. The skin layer 15 has a thickness of 20 microns.

Polycarbonate has a chain polymer structure with carbonic ester bonds in the principal chain. It is generally synthesized from bisphenol-A (a type of dihydric phenol) and phosgene. Polycarbonate is highly transparent, has excellent impact resistance, and is extensively used in engineering, plastics, and films.

As shown in FIG. 1, the shown bag 11 according to this embodiment has a bag body 17 and handles 18 integrated with the bag body 17 for being held by hand.

Symbol 19 is a pocket.

In the present invention, the skin layer 15 and the adhesive layer 16 are made from a polycarbonate-series urethane resin. Performance of the polycarbonate-series urethane resin (trade name: Luckskin US-1655-2) consisting of the skin layer 15 adopted in the present embodiment is shown in Table 1. The polycarbonate-series urethane resin has high hydrolysis resistance and heat resistance.

Furthermore, in the below table, "MEK" indicates methylethylketone, "DMF" is dimethylformamide, and "TOL" indicates toluene.

TABLE 1

Physical properties

| Resin detail | US-1655-2<br>PC conversion common type polyurethane resin |
|---|---|
| Liquid appearance | Clear light yellow |
| Solid concentration (%) | 25 |
| Viscosity (mPa · s/30° C.) | 20,000 |
| Solvent composition | DMF/MEK/TOL |
| Diluting agent | DMF/MEK = 1/1 |
| Film physical properties | |
| 100% MD (MPa) | 11.0 |
| Tensile strength (MPa) | 70.0 |
| Extension percentage (%) | 400.0 |

Thickness 20 microns

In the present embodiment, a mixture where US-1655-2, a diluting agent and a coloring agent were diluted at 100:30:20 was coated on an exfoliate paper at 80 to 100 g/m² wet, and dried at 100 to 200° C. for 2 to 3 minutes.

Regarding the adhesion with wet synthetic leather, Luclskin U-4123 (coloring) was coated, and thermally laminated after drying. Regarding the adhesion with the base fabric, two solutions of Luclskin U-4123-1 were combined, and after it was coated, lamination was conducted.

Durability evaluation of the polycarbonate-series urethane resin consisting of the skin relating to the present embodiment is shown below.

TABLE 2

Durability Evaluation

| | 100% MD (MPa) | Tensile Strength (MPa) | Extension Percentage (%) |
|---|---|---|---|
| Blank | 10.8 | 68.0 | 390 |
| Hydrolysis resistance | | | |
| 70° C. × 95% × 3 W | 10.8 | 68.0 | 375 |
| 70° C. × 95% × 8 W | 10.2 | 66.5 | 390 |
| 70° C. × 95% × 10 W | 10.3 | 57.7 | 350 |

Next, performance of the polycarbonate-series urethane resin (trade name: Luckskin US-4233-1), which consists of the adhesive layer used in the present embodiment, and is used as an adhesive, is shown in Table 2. The polycarbonate-series urethane resin used for this adhesive also has high hydrolysis resistance and heat resistance similarly to the above.

TABLE 3

Luckskin UD-4233-1
Physical properties

| Resin detail | UD-4233-1<br>PC conversion common type polyurethane resin |
|---|---|
| Liquid appearance | Clear light yellow |
| Solid concentration (%) | 60 |
| Viscosity (mPa · s/30° C.) | 20,000 |
| Solvent composition | DMF/TOL/MEK<br>20/65/15 |
| Film physical properties *1) | |
| 100% MD (MPa) | 2.5 |
| Tensile strength (MPa) | 20.0 |
| Extension percentage (%) | 400.0 |

Thickness 46.5 microns
*1) The film physical properties were measured with cross-linking film of UD-4233-1/U-4000/UY-5 = 100/10/1.

In the present embodiment, a resin (US-1655-2) to be used for the skin layer was applied onto an exfoliate paper; the obtainment was dried; then, the composite liquid of UD-4233-1 was applied at 100 to 200 g/m² wet; the obtainment was dried at 100° C. for 1 minute; the obtainment was thermally laminated to the base fabric at. 100° C.; and then it was aged at 80° C. for 48 hours. Durability evaluation of the polycarbonate-series urethane resin consisting of the adhesive agent relating to the present embodiment is shown below.

TABLE 4

Durability evaluation (measured with cross-linking film of UD-4233-1/U-4000/UY-5 = 100/10/1)

| | 100% MD (MPa) | Tensile Strength (MPa) | Extension Percentage (%) |
|---|---|---|---|
| Blank | 2.4 | 18.9 | 400 |
| Hydrolysis resistance | | | |
| 70° C. × 95% × 3 W | 2.4 | 15.0 | 370 |
| 70° C. × 95% × 6 W | 1.6 | 9.0 | 330 |
| 70° C. × 95% × 10 W | 1.4 | 8.0 | 320 |

Moreover, results of physical property test regarding the durability evaluation of the polycarbonate-series urethane resin consisting of the skin layer and the adhesive layer in the present embodiment are shown in Table 5.

This durability test is referred to as a "jungle test," and physical properties of the polycarbonate-series urethane resin in the form of a film after 3 weeks, 6 weeks and 10 weeks under conditions of temperature 70° C. humidity 95% were examined by collecting data concerning "100% MD (module)" indicating the degree to specimens, and "tensile strength" and "extension percentage" indicating the length rupturing the specimens when tension is applied to the specimens and pulled them.

In other words, in Table 5 below, "100% MD (MPa)" in the "film physical properties" means a force to be applied on the occasion of stretching a sample with 10 cm of length to 20 cm, and for example, 10.8 MPa means 108 kg. Moreover, "tensile strength" means a force to be applied on the occasion of stretching a sample with 1 m³ of volume to be torn off, and for example, 68.0 MPa means 680 kg. "Extension percentage (%)" means a ratio of stretch on the occasion of stretching a sample to be torn off, and for example, 390% means that the sample is torn off when it is stretched to 3.9 times.

TABLE 5

Deterioration with age of film physical properties after 3, 6 and 10 weeks of jungle test (70° C. × 95%)

| Duration | Film physical properties | Skin resin Polycarbonate-series urethane resin | Adhesive Polycarbonate-series urethane resin |
|---|---|---|---|
| Blank (normal condition) | 100% MD (MPa) | 10.8 | 2.4 |
| | Tensile strength (MPa) | 68.0 | 18.9 |
| | Extension percentage (%) | 390 | 400 |
| 3 weeks | 100% MD (MPa) | 10.8 (100%) | 2.4 (100%) |
| | Tensile strength (MPa) | 68.0 (100%) | 15.0 (79%) |
| | Extension percentage (%) | 375 (96%) | 370 (93%) |
| 6 weeks | 100% MD (MPa) | 10.2 (94%) | 1.6 (67%) |
| | Tensile strength (MPa) | 66.5 (98%) | 9.0 (48%) |
| | Extension percentage (%) | 370 (95%) | 330 (83%) |
| 10 weeks | 100% MD (MPa) | 10.3 (95%) | 1.4 (58%) |
| | Tensile strength (MPa) | 57.7 (85%) | 8.0 (42%) |
| | Extension percentage (%) | 350 (90%) | 320 (80%) |

*Data of the adhesive is after 2-solution cross-linking.
Thickness of skin: 20 microns
Thickness of adhesive: 46.5 microns In the meantime, for the comparison with the polycarbonate-series urethane resin used in the present embodiment, result of collecting data regarding ester-series general type resin, which is used for general synthetic leather, from the similar viewpoints of above Table 5 are shown in Table 6.

TABLE 6

Deterioration with age of film physical properties after 3, 6 and 10 weeks of jungle test (70° C. × 95%)

| Duration | Film physical properties | Skin resin Polyester-series common type urethane resin | Adhesive Polyester-series common type urethane resin |
|---|---|---|---|
| Blank (normal condition) | 100% MD (MPa) | 7.7 | 1.6 |
| | Tensile strength (MPa) | 72.2 | 22.2 |
| | Extension percentage (%) | 572.0 | 568.0 |
| 3 weeks | 100% MD (MPa) | 6.5 (84%) | 0.8 (50%) |
| | Tensile strength (MPa) | 41.4 (57%) | 4.0 (18%) |
| | Extension percentage (%) | 468.7 (82%) | 285.5 (50%) |
| 6 weeks | 100% MD (MPa) | 5.2 (68%) | 0.3 (19%) |
| | Tensile strength (MPa) | 24.5 (34%) | 2.4 (11%) |
| | Extension percentage (%) | 328.3 (57%) | 212.1 (37%) |
| 10 weeks | 100% MD (MPa) | 3.4 (44%) | Deteriorated, so immeasurable |
| | Tensile strength (MPa) | 6.0 (8%) | |
| | Extension percentage (%) | 147.3 (26%) | |

*Data of the adhesive is after 2-solution cross-linking.
Thickness of skin: 20 microns
Thickness of adhesive: 46.5 microns Therefore, as it is obvious from the comparison between above Table 5 and Table 6, with the polycarbonate-series urethane resin, regarding "100% MD (MPa)" indicating hardness, the hardness of the polycarbonate-series urethane resin is used for the skin layer 15 was 10.8; in the meantime, that of the ester-series common type urethane resin was 7.7, so this result indicates that the hardness of the polycarbonate-series urethane resin is higher.

The hardness of the ester-series common type urethane resin decreased to 3.4 after 10 weeks; in the meantime, that of the polycarbonate-series urethane resin was 10.3 even after 10 weeks passed, so this result indicates that the hardness of the polycarbonate-series urethane resin does not decrease compared to that of the ester-series common type urethane resin even after years have passed. In this case, one week in the above jungle test is equivalent to the environment for 1 year in daily life, so the above-values are values after 10 years.

This result indicates that the polycarbonate-series urethane resin will not be deteriorated even after 10 years.

Moreover, the hardness of the polycarbonate-series urethane resin used for the adhesive layer was 2.4; in the meantime, the hardness of the ester-series common type urethane resin was 1.6, so this result indicates that the hardness of the polycarbonate-series urethane resin is higher.

The ester-series common type urethane resin was "deteriorated, so immeasurable" after 10 weeks; in the meantime, the hardness of the polycarbonate-series urethane resin is 1.4 even after 1.0 weeks, so this result indicates that the hardness does not decrease even after years have passed compared to that of the ester-series urethane resin. In this case, one week in the above jungle test is equivalent to the environment for 1 year in daily life, so the above-values are values after 10 years.

This result indicates that the polycarbonate-series urethane resin will not be deteriorated even after 10 years.

In addition, the bag relating to the present embodiment is made from a half-tricot fabric where the base fabric layer 13 is formed from a nylon material. Data from a test for the tensile strength and the extension percentage regarding this half-tricot fabric is shown in Table 7. In this case, in Table 7, "wale direction" indicates a winding direction of the fabric to a roll, and "horizontal row direction" indicates a crosswise direction of the fabric on the occasion of winding the fabric to a roll.

TABLE 7

Test results
Tensile strength and extension percentage

| | Wale direction | | Horizontal row direction | |
|---|---|---|---|---|
| | Tensile strength (N {kgf}) | Extension percentage (%) | Tensile strength (N {kgf}) | Extension percentage (%) |
| No. 1 | 274.3 {28.0} | 74.9 | 237.7 {24.3} | 116.4 |
| No. 2 | 269.2 {27.5} | 71.0 | 230.5 {22.5} | 116.0 |

Test Results

Tensile strength and extension percentage: JIS L 1018: 1999, knit fabric test method 8.13 graph method Constant rate extension type testing machine was used, clutch interval: 76 mm, tension rate: 100 mm/min.

Therefore, as it is obvious from the above Table 7, in the half-tricot fabric made from nylon consisting of the base fabric layer 13, the extension percentage in the winding direction of fabric to a roll ("wale direction") was 74.9%; in the meantime, the crosswise direction on the occasion of winding the fabric to a roll ("horizontal row direction") was 116.4%, so the extension percentage in the winding direction of the fabric is lower than that in the crosswise direction.

Therefore, when the skin material 12 relating to the present embodiment is formed using the vertical direction of the bag as the winding direction, the extension percentage of the base fabric in the vertical direction of the bag was lower than that in the crosswise direction.

As a result, when the bag is used, if the bag is used by holding a handle with a hand or by putting a strap on a shoulder, the stress to pull the bag upward is applied in the vertical direction of the bag. However, even when this stress is applied, the base fabric layer 13 itself hardly stretches.

Moreover, as it is obvious from Tables 6 and 7, since the half-tricot fabric made from a nylon material, which is a material of the above base fabric 13, has a smaller extension percentage compared to polycarbonate, which is a material of the skin layer 15 adhered to the base fabric layer 13, even when the tension from the lower side to the upper side or various external forces are applied to the skin material, because the base fabric itself hardly stretches, the skin material hardly stretches, so the loss of shape will not occur to the bag; and in addition, the bag shape will not be deformed after extended use.

Moreover, in the bag relating to the present embodiment, since the base fabric is the half-tricot fabric, the surface of the base fabric layer 13 is formed to be smooth. Therefore, even when the skin material layer 15 forming with 20 microns of polycarbonate and 46.5 microns of the adhesive layer 16 are formed on the upper surface of the base fabric layer 13, since the mesh of the half-tricot hardly expresses to the skin side, a smooth surface of the skin material 12 can be formed, a bag, which is lightweight, easily foldable and excels in the portability, can be provided.

Moreover, since the base fabric layer 13 is the half-tricot fabric, and since the surface is smooth and the mesh of the half-tricot fabric will not be expressed on the skin layer 15, creping can be added to the minute surface printing emboss by the exfoliate paper, and printing with fine pattern becomes possible, so a bag with excellent quality of apparent condition can be provided.

As a result, even when various forces, such as flexion or tension, are applied to the skin material 12 of the bag 11 from the outside at the time of use, the skin layer 15 and the base fabric layer 13 are hardly separated.

Therefore, in the present embodiment, a bag where a change in shape or a loss in shape is less after extended use, and which excels in the durability, can be provided.

Moreover, the base fabric layer 13 formed from the half-tricot fabric made from nylon hardly stretches along the vertical direction; the base fabric layer 13 and the skin layer 15 are strongly adhered; and as it is obvious from Tables 5 and 6, because polycarbonate has a lower extension percentage compared to polyester-series polyurethane, even when the bag 11 contains contents, the skin material 12 hardly stretches in the vertical direction of the bag 11, and a situation where the skin material 12 after extended use can be prevented.

In addition, the base fabric layer 13 formed from the half-tricot fabric has great tear strength, so even when a small cut is formed on the skin, a situation where the cut extends and the skin is torn off can be prevented.

Moreover, since the half-tricot fabric is formed to be thinner than double-tricot fabric, the thickness of the entire skin material 12 composed of this can become thinner. The skin 12 of the bag 11 is made of a polycarbonate material, which provides significantly improved hydrolysis resistance, particularly perspiration resistance.

Therefore, the skin 12 does not easily deteriorate. Even when it is extendedly used, for example, it is difficult for a situation where the skin 12 at the handle 18 is cracked and the skin 12 is peeled off to occur.

Three physical tests were conducted to evaluate the skin 12 for hydrolysis resistance, including chemical resistance, perspiration solution resistance, and artificial perspiration solution jungle tests. The results are shown in Tables 8 to 10 below.

For comparison, similar tests were conducted on polyester skins.

In the tables below, Class 5 indicates the best result as "no change." Lower class numbers indicate more observed change. Class 1 indicates the worst result.

Chemical Resistance Test Results

TABLE 8

|  | polycarbonate skin | polyester skin | Test method |
|---|---|---|---|
| acid dropping (acetic acid) | Class 5 | Class 4 | apply two droplets and evaluate the appearance after natural drying (JIS L0851) |
| alkali dropping | Class 5 | Class 4 | apply two droplets and evaluate the appearance after natural drying (JIS L0852) |
| benzin resistance | Class 5 | Class 5 | apply two droplets and evaluate the appearance after natural drying (original method) |
| ethanol resistance | Class 5 | Class 5 | apply two droplets and evaluate the appearance after natural drying (original method) |
| paradichlorobenzene resistance (insecticide resistance) | Class 5 | Class 5 | spray on the skin surface, seal with a cover glass and leave for 12 hrs, and then evaluate the appearance (original method) |

Perspiration Solution Resistance Test Results

TABLE 9

|  | polycarbonate skin | polyester skin | Test method |
|---|---|---|---|
| Artificial perspiration solution test (acid) | Class 5 | Class 4 | after perspiration solution was dried, the skins stuck together and were placed under conditions at 37° C. and at 45 Newton for 4 hours and the difficulty to be peeled off and appearance after the test were evaluated |
| Artificial perspiration solution test (alkaline) | Class 5 | Class 4 | Same as the above. |

Artificial Perspiration Solution Jungle Accelerated Test Results

TABLE 10

|  | polycarbonate skin | polyester skin | Test method |
|---|---|---|---|
| 6-day test (equivalent to 5 years) | Class 5 | Class 3 | Using 5-fold concentrate of JIS L0848D artificial perspiration solution at 70° C. × 95% |
| 12-day test (equivalent to 10 years) | Class 5 | Class 1 | Same as the above. |

As seen from the artificial perspiration solution jungle accelerated test above, the polyester skin showed significant change after it made contact with the perspiration solution. On the other hand, the polycarbonate skin according to the present invention showed no change after it made contact with the perspiration solution, having excellent perspiration resistance.

The polycarbonate skin 12 also has excellent light resistance. Colored parts do not fade or the skin surface does not yellow under the sun or fluorescent lighting. A physical test was conducted to prove excellent light resistance of the skin 12. The results are shown in Table 11 below.

Light Resistance Test

TABLE 11

|  | polycarbonate skin | polyester skin | test method |
|---|---|---|---|
| Fade (BP: 83° C.) 50 hours | Class 5 | Class 3 | evaluate the skin surface for discoloration |
| Fade (BP: 83° C.) 100 hours | Class 4 to 5 | Class 2 to 3 | Same as the above. |

The skin 12 consists of the base fabric layer 13 and the polycarbonate layer 14 formed on the base fabric layer 13. The base fabric layer 13 serves to fix the polycarbonate layer 14 in place. Therefore, because the polycarbonate layer 14 is reliably supported by the base fabric layer 13, the polycarbonate layer 14 consists of the skin layer 15 and the adhesive layer provided between the skin layer 15 and the base fabric layer 13. Therefore, there is no need of preparing two different materials for the two, surface and adhesive, layers 15 and 16; and only one polycarbonate material is used. Use of additional materials is eliminated, thereby reducing cost.

With the polycarbonate adhesive layer 16, hydrolysis does not occur in the adhesive layer 16. Therefore, the skin layer 15 does not peel off the base fabric layer 13, improving durability.

The surface and adhesive layers 15 and 16 are in the form of a film. The skin layer 15 in the form of a film is simply laminated on the base fabric layer 13 via the adhesive layer 16 also in the form of a film to form the skin 12. The production process of the skin 12 is simplified, therefore reducing cost.

Furthermore, with the adhesive and skin layers 16 and 15 being in the form of a film, the skin 12 entirely has A uniform thickness, therefore improving quality.

The base fabric layer 13 has a thickness of 250 microns, the adhesive layer 16 has a thickness of 46.5 microns, and the skin layer 15 has a thickness of 20 microns. The overall thickness of the skin 12 is not excessively increased. The skin can maintain lightweight and flexibility, having excellent usability when used in the bag 11.

INDUSTRIAL APPLICATION

The present invention is applicable to any bag.

What is claimed:

1. A bag comprising:
a body comprising a nylon base fabric layer and a polycarbonate skin material layer adhered to said base fabric layer by a polycarbonate adhesive layer, said body having an outer surface, an inner surface defining a storage space, an opening passing from the outer surface to the inner surface and communicating with the storage space, and handles extending outwardly from the outer surface of the body proximate an upper end thereof.

2. The bag according to claim 1, wherein said skin material layer and said adhesive layer are each a polycarbonate-series urethane resin.

3. The bag according to claim 1, wherein said base fabric layer is a half-tricot fabric.

4. The bag according to claim 3, wherein said skin material layer and said adhesive layer are films.

5. The bag according to claim 3, wherein said base fabric layer has a thickness of 250 microns, said adhesive layer has a thickness of 46.5 microns, and said skin material layer has a thickness of 20 microns.

* * * * *